United States Patent
Tsubota et al.

(10) Patent No.: US 7,203,031 B2
(45) Date of Patent: Apr. 10, 2007

(54) SUBSTRATE FOR THIN-FILM MAGNETIC HEAD AND METHOD OF MANUFACTURING THE SUBSTRATE

(75) Inventors: Hironobu Tsubota, Osaka (JP); Shinji Tsujimoto, Ibaraki (JP); Taisuke Hirooka, Kobe (JP)

(73) Assignee: Neomax Co., Ltd., Osaka (JP)

( * ) Notice: Subject to any disclaimer, the term of this patent is extended or adjusted under 35 U.S.C. 154(b) by 126 days.

(21) Appl. No.: 10/433,376

(22) PCT Filed: Dec. 16, 2002

(86) PCT No.: PCT/JP02/13144

§ 371 (c)(1),
(2), (4) Date: Jun. 3, 2003

(87) PCT Pub. No.: WO03/052748

PCT Pub. Date: Jun. 26, 2003

(65) Prior Publication Data

US 2004/0037003 A1   Feb. 26, 2004

(30) Foreign Application Priority Data

Dec. 17, 2001 (JP) ............................. 2001-383072

(51) Int. Cl.
*G11B 5/127* (2006.01)
(52) U.S. Cl. .................................................. 360/126
(58) Field of Classification Search ............. 360/253.3, 360/322, 126; 428/65.5, 216, 692, 64.1, 428/213; 430/67; 385/131; 204/192.23; 525/474
See application file for complete search history.

(56) References Cited

U.S. PATENT DOCUMENTS

| 4,775,606 A | * | 10/1988 | Shirai ........................... 430/67 |
| 4,796,127 A | | 1/1989 | Wada et al. |
| 4,814,915 A | | 3/1989 | Wada et al. |
| 4,879,334 A | * | 11/1989 | Hasegawa et al. .......... 525/474 |
| 5,448,437 A | | 9/1995 | Katahara |
| 5,480,695 A | * | 1/1996 | Tenhover et al. .......... 428/65.5 |
| 5,609,948 A | * | 3/1997 | David et al. ................. 428/216 |
| 5,670,253 A | | 9/1997 | Chiu et al. |
| 5,949,944 A | * | 9/1999 | Minford et al. ............. 385/131 |
| 6,256,171 B1 | * | 7/2001 | Yoda et al. ............... 360/235.3 |
| 6,329,087 B1 | * | 12/2001 | Okamoto ..................... 428/692 |
| 6,417,999 B1 | * | 7/2002 | Knapp et al. ................ 360/322 |
| 6,551,679 B1 | * | 4/2003 | Kuroda et al. ............. 428/64.1 |
| 6,572,958 B1 | * | 6/2003 | Chour et al. ................. 428/213 |
| 6,666,958 B1 | * | 12/2003 | Yoshikawa et al. .... 204/192.23 |
| 6,686,647 B2 | * | 2/2004 | Kimura et al. .............. 257/604 |

FOREIGN PATENT DOCUMENTS

| JP | 5-151736 | 6/1993 |
| JP | 5-182133 | 7/1993 |
| JP | 6-150599 | 5/1994 |
| JP | 9-128711 | 5/1997 |

* cited by examiner

*Primary Examiner*—Tianjie Chen
(74) *Attorney, Agent, or Firm*—Keating & Bennett, LLP

(57) ABSTRACT

A substrate for a thin-film magnetic head includes a ceramic base and an undercoat film of amorphous SiC, which is supported on the ceramic base.

11 Claims, 7 Drawing Sheets

SUBSTRATE FOR THIN-FILM MAGNETIC HEAD AND METHOD OF MANUFACTURING THE SUBSTRATE

BACKGROUND OF THE INVENTION

1. Field of the Invention

The present invention relates to a substrate for use to make a thin-film magnetic head slider for a hard disk drive (which will be referred to herein as a "thin-film magnetic head substrate") and also relates to a method of manufacturing such a substrate.

2. Description of the Related Art

Thanks to recent tremendous development of information and telecommunication technologies, the amount of information that can be processed by computers has increased by leaps and bounds. In particular, audiovisual (or multimedia) information such as sounds, music and video, which used to be capable of being processed only as analog signals, now can be converted into digital signals and processed by personal computers. Multimedia data such as music and video contains a huge amount of information. Thus, it has become more and more necessary to further increase the capacity of storage media for use in personal computers, for example.

A hard disk drive is a typical information storage device that has been used broadly in personal computers, for example. To meet the demand described above, the capacity of hard disks needs to be further increased and the overall size of the drive needs to be reduced.

FIG. 7 is a cross-sectional view schematically illustrating a thin-film magnetic head slider and surrounding portions thereof in a conventional hard disk drive. As shown in FIG. 7, an undercoat film 13 is provided on a side surface of a base 12, which is supported on a gimbal 10. A read/write head 14' is provided on the undercoat film 13. Such a unit, including the base 12 and read/write head 14' to be supported on the gimbal 10, is normally called a "head slider" or simply "slider".

The read/write head 14' is made of a magnetic material and has a notched ring configuration, inside which a coil 15 is wound. When a recording signal is supplied to the coil 15, a magnetic field is generated in the read/write head 14', thereby writing data on a magnetic storage medium 17. Also, the read/write head 14' senses a variation in the magnetic field on the magnetic storage medium 17 and converts the sensed variation into an electric signal representing the data that is stored on the magnetic storage medium 17.

FIG. 8 illustrates another conventional thin-film magnetic head slider. The thin-film magnetic head slider shown in FIG. 8 includes two separate magnetic heads, i.e., a read head 16 and a write head 14, to perform the read operation more efficiently. The structure of the write head 14 is similar to that of the read/write head 14' shown in FIG. 7 and is used exclusively to write data on the magnetic storage medium 17.

On the other hand, the read head 16 is a magneto-resistive (MR) or giant MR (GMR) element to convert a variation in magnetic field into a variation in electrical resistance. That is to say, the read head 16 senses a variation in the magnetic field recorded on the magnetic storage medium 17, thereby producing an electric signal representing the data that is stored on the magnetic storage medium 17.

The base 12 to hold the read/write head 14' or the read head 16 and the write head 14 thereon has often been made of an $Al_2O_3$—TiC based ceramic sintered body. The $Al_2O_3$—TiC based ceramic material (which will be herein referred to as an "AlTiC material") has been used extensively because this material exhibits excellent thermal and mechanical properties and processability while striking an adequate balance between them. However, the AlTiC material is a good electrical conductor. Accordingly, if the read/write head 14' or write head 14 was disposed adjacent to such a conductor base 12, then the read/write head 14' or the write head 14 would be short-circuited and could not operate properly. Also, the surface of such an AlTiC base has pores and is not sufficiently smooth. For that reason, to electrically insulate the read/write head 14' or write head 14 from the base 12 sufficiently and increase the smoothness of the surface of the base 12, the undercoat film 13 of $Al_2O_3$ is normally provided on the side surface of the base 12. This is because $Al_2O_3$ exhibits a good insulation property and has a smooth enough surface.

Recently, however, it has become more and more necessary to further increase the storage capacity of hard disks and yet reduce the overall size of hard disk drives as described above. To meet these demands, a slider having a different structure was proposed. In the proposed structure, the read and write heads 16 and 14 are arranged in reverse order as shown in FIG. 9A. That is to say, the read head 16 is disposed adjacent to the undercoat film 13 and the write head 14 is spaced apart from the base 12.

To realize a hard disk drive including a slider with the newly proposed structure, however, various problems must be overcome.

Firstly, as it has become more and more necessary to reduce the overall size of hard disk drives, sliders also must be further reduced in size. To reduce the size of sliders, the cross-sectional area of the coil 15 inside the write head 14 should be reduced as shown in FIG. 9B. More specifically, the inside diameter of the coil 15 needs to be minimized and yet respective loops of the coil 15 should not overlap with each other. However, when a current flows through the coil 15 with such a reduced cross-sectional area by way of terminals 18, the quantity of heat generated per unit area increases.

However, $Al_2O_3$, which has often been used as a material for the undercoat film 13, does not have such good thermal conductivity. Accordingly, the heat, generated by supplying the coil 15 with current, is shut off by the $Al_2O_3$ undercoat film 13, and cannot diffuse toward the base 12 sufficiently. Thus, the heat is stored in the read head 16 or the write head 14. As a result, the read head 16 or the write head 14 thermally expands and protrudes toward the magnetic storage medium 17 as indicated by the arrow in FIG. 9A. The gap between the read head 16 or the write head 14 and the magnetic storage medium 17 is as small as about 10 nm. Thus, it is quite possible for the thermally expanded read head 16 or write head 14 to contact with the magnetic storage medium 17 accidentally.

This phenomenon is called a "thermal pole tip recession (TPTR)". When this phenomenon happens, the read head 16 or the write head 14 physically contacts with the magnetic storage medium, thereby scratching the magnetic storage medium or damaging the read head 16 or the write head 14 itself. Then, a serious failure might be caused, or the hard disk drive could not operate properly anymore.

Also, even if the read head 16 or the write head 14 can avoid contact with the magnetic storage medium 17, the gap between the read head 16 or the write head 14 and the magnetic storage medium 17 changes due to the thermal expansion of the read head 16 or the write head 14. For example, when the read head 16 or the write head 14 expands several nanometers, the gap between the magnetic storage medium 17 and the read head 16 or the write head 14 decreases 10% or more. Then, the read or write performance is affected significantly, and errors may be created in the signals to be written on, or read out from, the magnetic storage medium.

To overcome this problem, the undercoat film 13 may have a reduced thickness so that the heat can be radiated into the base 12 more easily. In that case, however, the pores on the surface of the base 12 would decrease the surface smoothness of undercoat film 13, thus making the undercoat film 13 almost meaningless.

Furthermore, because the size of the read head 16 or the write head 14 has been decreased for the reasons described above, it becomes more and more probable that electrostatic breakdown is caused in the read head 16 and the write head 14 by static electricity generated. Static electricity is generated particularly easily in a hard disk drive because the rigid magnetic storage medium rotates at a high velocity. On the other hand, the read head 16 and the write head 14 are provided on the undercoat film 13 of $Al_2O_3$ with high electrical insulating property. As a result, the static electricity generated is likely stored in the read head 16 and the write head 14. When the quantity of the static electricity stored exceeds a predetermined limit, the static electricity stored is discharged at a time, thus causing electrostatic breakdown on the read head 16 and the write head 14.

This problem also seems to be solved if the undercoat film 13 has a reduced thickness and lower insulating property. In that case, however, the static electricity stored could be discharged into the AlTiC base 12 that is adjacent to the undercoat film 13. Then, dielectric breakdown could occur in the undercoat film 13.

SUMMARY OF THE INVENTION

In order to overcome the problems described above, preferred embodiments of the present invention provide a thin-film magnetic head substrate and a manufacturing method thereof that can be used effectively to significantly increase the reliability of a miniaturized, high-capacity hard disk drive by eliminating the TPTR phenomenon, read or write errors, and electrostatic or dielectric breakdown.

A thin-film magnetic head substrate according to a preferred embodiment of the present invention preferably includes a ceramic base and an undercoat film of amorphous SiC, which is supported on the ceramic base.

In a preferred embodiment of the present invention, the undercoat film preferably has a thickness of about 0.1 μm to about 10 μm.

In another preferred embodiment of the present invention, the undercoat film preferably has a volume resistivity of about $1 \times 10^{-1}$ Ω·cm to about $1 \times 10^{15}$ Ω·cm.

In still another preferred embodiment, the undercoat film preferably has an average surface roughness of at most about 1 nm.

In yet another preferred embodiment, the amorphous SiC preferably includes about 20 at % to about 80 at % of Si and about 20 at % to about 80 at % of C as its main ingredients.

In this particular preferred embodiment, the amorphous SiC may further include about 5 at % to about 15 at % of O.

More particularly, the amorphous SiC may further include at least one of H and Ar.

In yet another preferred embodiment, the ceramic base preferably has a thermal conductivity of at least about 5 W/mK.

In yet another preferred embodiment, the ceramic base preferably has a volume resistivity of about $1 \times 10^{-5}$ Ω·cm to about $1 \times 10^9$ Ω·cm.

In yet another preferred embodiment, the ceramic base preferably has an average surface roughness of at most about 2.5 nm.

In yet another preferred embodiment, the ceramic base is preferably made of an alumina-based ceramic material including about 24 mol % to about 75 mol % of $\alpha$-$Al_2O_3$ and at most about 2 mol % of additive. The balance of the alumina-based ceramic material may be any material that exhibits good electrical and thermal conductivities and a sufficiently low mechanical strength compared to alumina. Specifically, the alumina-based ceramic material preferably further includes about 24 mol % to about 75 mol % of a metal carbide or a metal carbonate nitride.

Another preferred embodiment of the present invention provides a thin-film magnetic head slider. The thin-film magnetic head slider preferably includes the thin-film magnetic head substrate according to any of the preferred embodiments of the present invention described above, and a read head and a write head, which are supported on the substrate.

Still another preferred embodiment of the present invention provides a hard disk drive. The hard disk drive preferably includes the thin-film magnetic head slider described above.

Yet another preferred embodiment of the present invention provides a method of manufacturing a thin-film magnetic head substrate. The manufacturing method preferably includes the step of forming an undercoat film of amorphous SiC on a ceramic base by a physical deposition process.

In one preferred embodiment of the present invention, the step of forming the undercoat film preferably includes the step of forming the undercoat film while maintaining the ceramic base at a temperature of about 200° C. to about 800° C.

Alternatively, the method may further include the step of annealing the undercoat film at a temperature of about 300° C. to about 800° C. after the step of forming the undercoat film on the ceramic base has been performed.

In another preferred embodiment, the step of forming the undercoat film preferably includes the step of forming the undercoat film in an atmosphere that includes argon gas at a partial pressure ratio of about 0.1 to about 0.6, hydrocarbon gas at a partial pressure ratio of about 0.1 to about 0.9, hydrogen gas at a partial pressure ratio of about 0 to about 0.5, and oxygen gas at a partial pressure ratio of about 0 to about 0.05.

Yet another preferred embodiment of the present invention provides a method of manufacturing a thin-film magnetic head slider. The method preferably includes the step of preparing the thin-film magnetic head substrate, including the ceramic base and the undercoat film of amorphous SiC on the ceramic base, according to any of the preferred embodiments of the present invention described above. The method preferably further includes the step of forming a read head and a write head on the undercoat film.

Other features, elements, processes, steps, characteristics and advantages of the present invention will become more apparent from the following detailed description of preferred embodiments of the present invention.

DETAILED DESCRIPTION OF PREFERRED EMBODIMENTS

Figure 1:
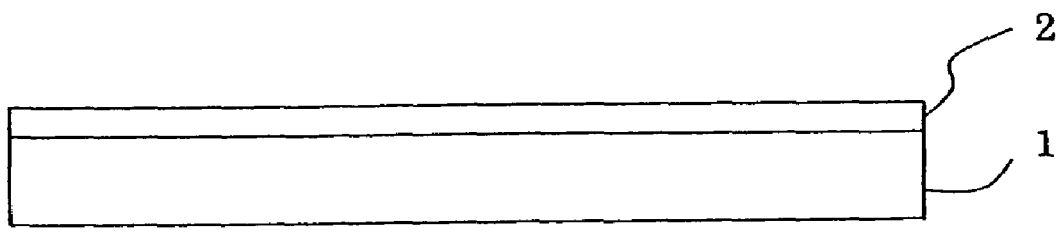
FIG. 1 is a cross-sectional view illustrating a preferred embodiment of a thin-film magnetic head wafer according to the present invention.

To overcome the problems of the conventional hard disk drive, an undercoat film of a thin-film magnetic head slider is preferably made of a material that can be used effectively to prevent the unwanted dielectric breakdown and that has good thermal conductivity. The present inventors carried out extensive research on this matter. As a result, the present inventors discovered and confirmed via experiments that the undercoat film of the newly proposed slider, in which the read head is adjacent to the undercoat film, does not always have to be highly electrically insulating. This is because the read head itself, which is implemented as an MR or GMR element, has an electrically insulating structure. For that reason, to prevent the dielectric breakdown, the undercoat film preferably has an adequate degree of electrical conductivity such that the electrical charge is diffused into the base by way of the undercoat film before an excessive quantity of electrical charge is stored in the undercoat film. The present inventors also discovered that the undercoat film of a slider with the conventional structure also needs to have a certain degree of an electrically insulating property but does not have to be as electrically insulating as alumina.

The present inventors tested various materials to find the best material to achieve this object. As a result, the present inventors discovered that silicon carbide (SiC) is most preferable as a semi-conductive material having an adequate degree of electrical conductivity and good enough thermal conductivity. SiC has been known as a semiconductor material or a material to coat a cutting tool with. The SiC materials are often used either in a single crystalline state or in a polycrystalline state. For example, U.S. Pat. No. 5,670,253 discloses that a polycrystalline SiC film, deposited on a base by a chemical vapor deposition (CVD) process, may be used for a thin-film magnetic head.

However, as a result of various types of experiments, the present inventors discovered that the single or polycrystalline SiC is a very brittle material and often cracks and chips when subjected to a cutting process. If a substrate, including such an SiC film that has been chipped by the cutting process, is used to make a thin-film magnetic head slider, then the SiC film might further chip inside the hard disk drive. In that case, such SiC chips might drop on the magnetic storage medium or scatter around the inside of the hard disk drive. Those chips could possibly cause a serious failure in the hard disk drive with the thin-film magnetic head slider, which is supported over the magnetic storage medium, rotating at a high velocity, with just a narrow gap provided between them.

Thus, the present inventors further researched the physical properties of SiC to determine how to avoid the unwanted cracking and chipping phenomena. As a result, the present inventors discovered that an amorphous SiC material has a significantly decreased brittleness and is effectively applicable for use to make a substrate for a thin-film magnetic head while avoiding those disadvantageous phenomena. The present inventors also discovered that even in its amorphous state, the SiC material still exhibits thermal and electrical conductivities that are good or adequate enough to overcome the problems described above.

The SiC film needs to have a variable degree of electrical conductivity (i.e., volume resistivity) according to the specific structure of the slider. However, the present inventors discovered that the volume resistivity of the SiC film can be controlled to a desired value by any of the following methods.

Specifically, the present inventors discovered that the volume resistivity of the resultant amorphous SiC film is changeable not only by heating the base to an appropriate temperature during the deposition process of the amorphous SiC film but also by annealing the amorphous SiC film deposited. According to the results of experiments that the present inventors carried out, the higher the temperature of the base or the annealing temperature, the higher the volume resistivity of the SiC film. Thus, the volume resistivity of the SiC film is controllable by utilizing this property. The present inventors further discovered that the volume resistivity and other physical properties of the amorphous SiC film are also adjustable even by controlling the atmosphere during the deposition process of the amorphous SiC film and changing the amounts of hydrogen and argon to be included in the resultant SiC film.

Hereinafter, specific preferred embodiments of the present invention will be described with reference to the accompanying drawings.

Figure 9A:
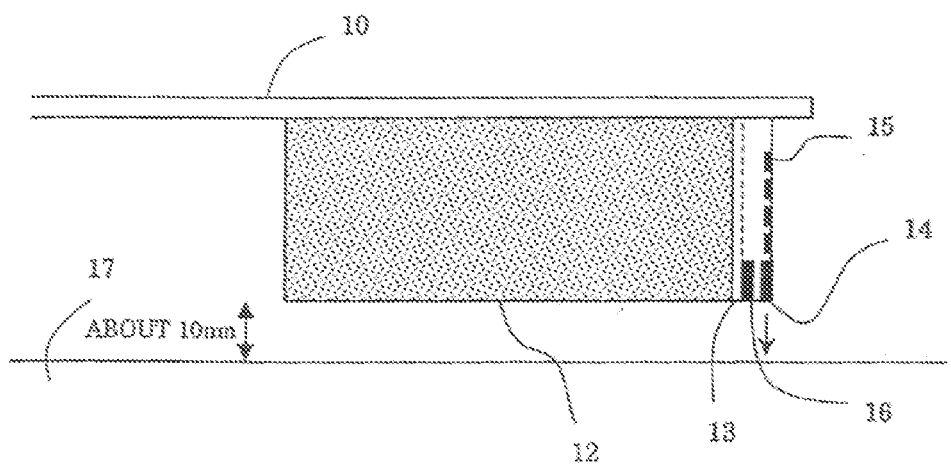
FIG. 9A is a cross-sectional view schematically illustrating still another conventional thin-film magnetic head slider.

FIG. 1 illustrates a wafer for use to make a thin-film magnetic head substrate according to a preferred embodiment of the present invention. As shown in FIG. 1, the wafer preferably includes a ceramic base 1 and an undercoat film 2 that is supported on the ceramic base 1. It should be noted that a chip, obtained by cutting the wafer shown in FIG. 1 vertically to the ceramic base 1, is preferably used as the thin-film magnetic head substrate, including the base 12 and the undercoat film 13, as shown in FIG. 9A.

To prevent the electrostatic breakdown, the ceramic material of the ceramic base 1 preferably has a volume resistivity that is within a range in which almost no static electricity is stored. More specifically, the ceramic material preferably has a volume resistivity of at most about $1 \times 10^9$ $\Omega \cdot$cm, which is the highest allowable volume resistivity of so-called "semi-conductive materials". On the other hand, the lower the volume resistivity of the ceramic material, the less likely it is that the static electricity is stored there. However, if the volume resistivity of the ceramic material is too low, then a metallic bonding property will dominate the ceramic material. In that case, the ceramic material should exhibit a high cutting resistance and a poor tribology property while being subjected to a cutting process. For that reason, the volume resistivity of the ceramic material is preferably at least about $1 \times 10^{-5}$ Ω·cm. That is to say, the ceramic base preferably has a volume resistivity of about $1 \times 10^{-5}$ Ω·cm to about $1 \times 10^9$ Ω·cm.

The ceramic base 1 is also preferably made of a material having high thermal conductivity. To prevent the heat which is generated from the read and write heads from being stored in the heads but to allow the heat to diffuse efficiently into the ceramic base 1 by way of the undercoat film 2, the ceramic material preferably has a thermal conductivity of at least about 5 W/mK, more preferably at least about 15 W/mK.

Also, if the ceramic base 1 has a high surface roughness, then the surface of the undercoat film 2 will not be smooth enough either. In that case, the surface roughness of the undercoat film 2 cannot be reduced to a predetermined range to be described later even if the undercoat film 2 is subjected to a polishing process. Accordingly, before the undercoat film 2 is deposited thereon, the ceramic base 1 preferably has an average surface roughness Ra of at most about 2.5 nm.

A ceramic material having any of various compositions may be used for the ceramic base 1 as long as the ceramic material exhibits those preferred properties. For example, the ceramic base 1 may include about 24 mol % to about 75 mol % of $\alpha$-$Al_2O_3$ and the balance thereof may include a metal carbide or a metal carbonate nitride and about 2 mol % or less of a sintering assistant. A base material having such a composition has only a few openings or pores and can be finished so as to have a very low surface roughness, and therefore, can be used effectively as a base material for a thin-film magnetic head slider. More specifically, a base made of a ceramic material including about 24 mol % to about 75 mol % of $\alpha$-$Al_2O_3$, about 24 mol % to about 75 mol % of TiC and about 2 mol % or less of a sintering assistant, can be used particularly effectively in a thin-film magnetic head slider.

Examples of other preferred ceramic bases that are applicable for use in a thin-film magnetic head slider according to a preferred embodiment of the present invention include a base made of an SiC—$Al_2O_3$ ceramic material as disclosed in Japanese Patent No. 1899891 or U.S. Pat. No. 4,769,127, a base made of a $ZrO_2$—$Al_2O_3$ ceramic material as disclosed in Japanese Patent No. 1659501 or U.S. Pat. No. 4,814,915, and a base made of a $ZrO_2$—SiC material, which is well known as a typical conductive ceramic material. However, a material that is hard to process into a desired shape and exhibits a poor tribology property (e.g., SiN) is not suitable for the ceramic base 1.

The undercoat film 2 is made of amorphous SiC. As described above, the conventional SiC film is deposited by a chemical deposition process such as a CVD process, and has a polycrystalline or single crystalline structure. In contrast, the present inventors deposited the amorphous SiC film by a physical deposition process such as sputtering or evaporation. An SiC film formed by such a process has no crystal structures and is amorphous. The amorphous SiC film for use in various preferred embodiments of the present invention may be formed by performing a sputtering process on a single or polycrystalline SiC target using a known sputtering apparatus. Alternatively, the amorphous SiC film may also be formed by performing a sputtering process on an Si target within an atmosphere of a gas including carbon.

Figure 2:
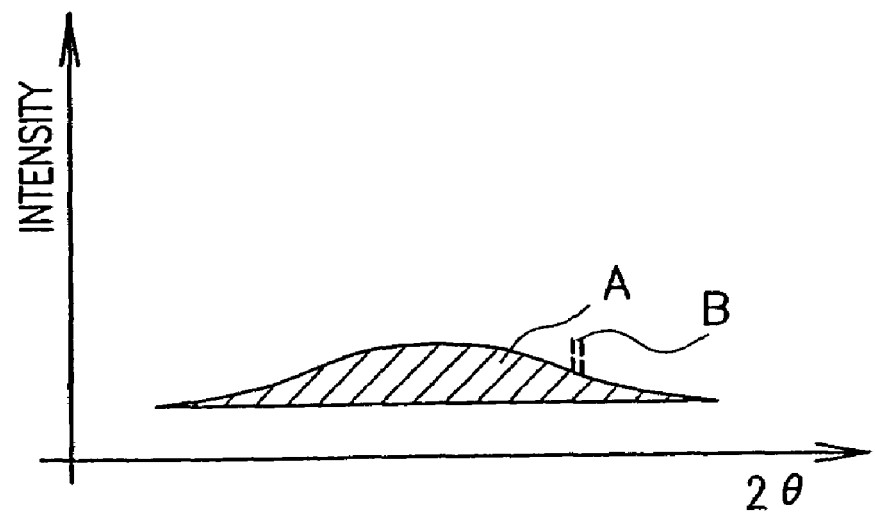
FIG. 2 is a graph showing an X-ray diffraction pattern of amorphous SiC.

The specific structure of the SiC film deposited can be identified by an X-ray diffraction (XRD) analysis. That is to say, it is possible to determine whether the SiC film has an amorphous structure or a single or polycrystalline structure by the presence or absence of a peak indicating a predetermined crystallographic orientation in the XRD analysis results. More specifically, as shown in FIG. 2, the SiC film is regarded as having an amorphous structure if only a broad peak A (i.e., so-called "halo") resulting from an amorphous structure is observed in the XRD analysis results. On the other hand, if a peak B resulting from crystalline SiC is observed at 2θ=35.8 degrees±3 degrees or 2θ=34.9 degrees±3 degrees, then the SiC film is regarded as having a crystalline structure.

It should be noted that as long as an amorphous SiC film can be obtained, the deposition process is not limited to the physical deposition processes described above.

The amorphous SiC film preferably includes about 20 at % to about 80 at % of Si and about 20 at % to about 80 at % of C as its main ingredients. Specifically, if the mole fraction of C is smaller than about 20 at %, then the resultant SiC material will have decreased anticorrosiveness. On the other hand, if the mole fraction of C is greater than about 80 at %, then the resultant SiC film will have an excessively high stress and a Vickers hardness Hv exceeding 1,600. Such a film is too hard and too brittle. The amorphous SiC film may further include about 5 at % to about 15 at % of O.

If the mole fraction of O is smaller than about 5 at %, then the structure of the resultant SiC film might have poor stability. Conversely, if the mole fraction of O is greater than about 15 at %, then the resultant SiC material will behave more like $SiO_2$. In that case, desired properties will not be achieved in the hardness, thermal conductivity and anticorrosiveness characteristics of the film. In this manner, the amorphous SiC film for use in this preferred embodiment may include a very small amount of oxygen within the range specified above.

Also, in addition to the respective constituent elements described above, the amorphous SiC film may further include Ti, Al, He, Ne, B, P, S and N as inevitable impurities. In particular, the constituent elements of the base 1, on which the undercoat film 2 should be formed, may be dissociated from the base 1 and absorbed into the undercoat film 2 depending on the conditions under which a plasma or ion beam is created during the deposition process of the undercoat film 2. However, even if very small amounts of those elements are included in the undercoat film 2, the properties of the resultant film will not be affected substantially.

The amorphous SiC film having such a composition preferably has a Vickers hardness Hv of about 1,000 to about 1,600, a linear expansivity α of about 3.0 to about 5.0, and a Young's modulus of about 150 GPa to about 300 GPa. The amorphous SiC film also has excellent processibility. Specifically, the amorphous SiC film can be planarized by a polishing process ten times or more as fast as a crystalline SiC film. Furthermore, the amorphous SiC film can keep close contact with the base. Thus, there is no need to provide any additional film between the ceramic base 1 and the amorphous SiC film 2 to increase the closeness of contact between them.

In this preferred embodiment, an amorphous SiC film having these advantageous features is preferably used as the undercoat film 2. The undercoat film 2 preferably has a thickness of about 0.1 μm to about 10 μm. The reasons are as follows. Specifically, if the thickness of the undercoat film 2 is less than about 0.1 µm, micro pores, which are potentially present in the ceramic base 1, cannot be filled with the undercoat film 2 completely. However, if the thickness of the undercoat film 2 is more than about 10 µm, then the thermal conduction distance would be too long to achieve a good thermal conductivity. In that case, the heat generated from the coil cannot be transmitted to the base rapidly enough. The undercoat film 2 more preferably has a thickness of about 0.5 µm to about 2 µm. This is because if the undercoat film 2 has a thickness of at least about 0.5 µm, the surface roughness thereof can be easily adjusted to be within the range to be specified below.

Also, the surface roughness of the undercoat film 2 is preferably adjusted to about 1 nm or less by a chemical mechanical polishing (CMP) process, for example. The surface of the undercoat film 2 should have that high planarity because the read head (e.g., an MR or GMR element) to be provided on the undercoat film 2 normally has a sensor portion with a thickness of about 10 nm or less.

To radiate the heat from the read or write head into the base 1 quickly, the undercoat film 2 preferably has a thermal conductivity of at least about 5 W/mK. The present inventors confirmed via experiments that this condition was satisfied as long as the undercoat film 2 was made of amorphous SiC.

Figure 9B:
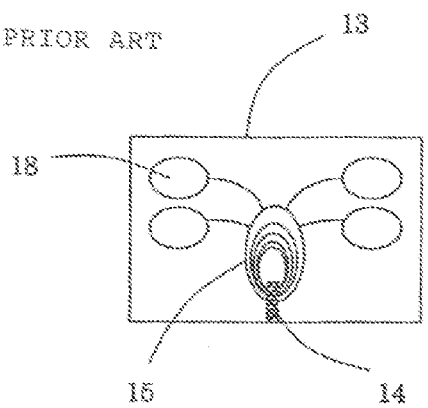
FIG. 9B is a side view illustrating a side surface of the slider shown in FIG. 9A in which the write head is embedded.

If the undercoat film 2 does not have to be highly electrically insulating unlike the slider having the newly proposed structure described above in which the read head itself has an electrically insulating structure (see FIG. 9), the undercoat film 2, as well as the ceramic base 1, preferably has as small a volume resistivity as possible. However, to obtain a preferred relationship between the undercoat film 2 and the ceramic base 1 or the element to be provided on the undercoat film 2, the undercoat film 2 preferably has a volume resistivity of about $1 \times 10^{-1}$ Ω·cm to about $1 \times 10^8$ Ω·cm. The reason is as follows. If the undercoat film 2 has a volume resistivity of less than about $1 \times 10^{-1}$ Ω·cm, then the electrical resistance thereof is too low. In that case, the electrical resistance of the undercoat film 2 will be too different from that of the element with an electrically insulating structure to be provided on the undercoat film 2, thus possibly causing a dielectric breakdown between them. On the other hand, if the volume resistivity of the undercoat film 2 exceeds about $1 \times 10^8$ Ω·cm, then the undercoat film 2 is excessively electrically insulating. In that case, a dielectric breakdown might possibly occur between the ceramic base 1 and the undercoat film 2 this time. Even in an arrangement in which a conductive shield film is disposed between the undercoat film 2 and the element, no dielectric breakdown will occur as long as the volume resistivity of the undercoat film 2 falls within the above-specified range.

Figure 7:
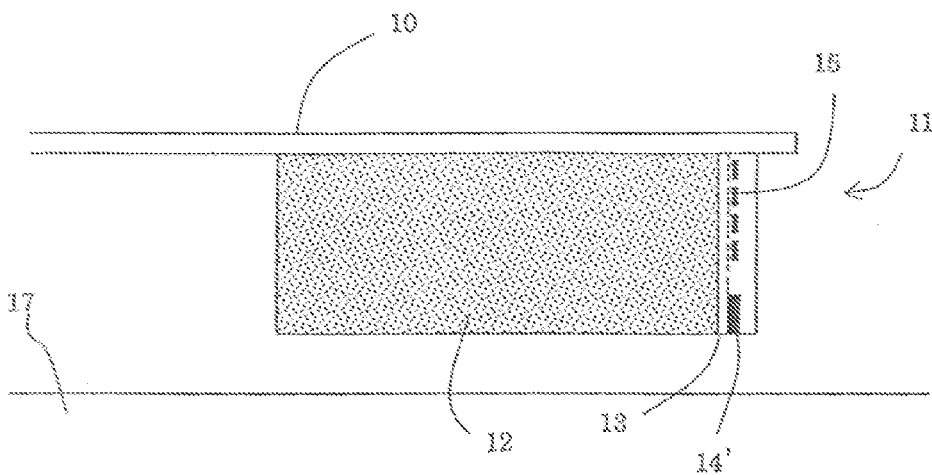
FIG. 7 is a cross-sectional view schematically illustrating a conventional thin-film magnetic head slider.
Figure 8:
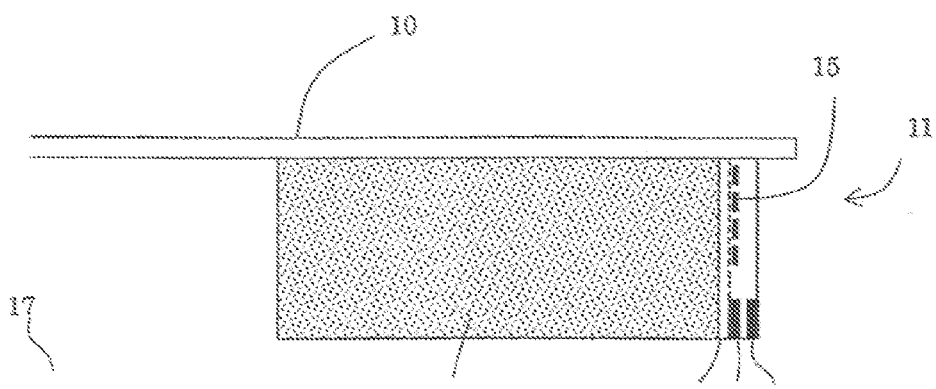
FIG. 8 is a cross-sectional view schematically illustrating another conventional thin-film magnetic head slider.

If the undercoat film 2 needs to be electrically insulating as in the slider with the conventional structure described above (see FIGS. 7 and 8), then the volume resistivity of the undercoat film 2 may be adjusted by the following methods. According to a preferred method, an SiC film, deposited as the undercoat film 2 by a normal physical deposition process, may be annealed at a temperature of about 300° C. to about 800° C. for approximately 1 to 12 hours. Then, the annealed SiC film can have a higher volume resistivity than the as-deposited SiC film. This annealing temperature range is preferred for the following reasons. Specifically, if the annealing temperature is less than about 300° C., then the annealing process is not effective enough to increase the volume resistivity sufficiently. However, if the undercoat film 2 is annealed at a temperature exceeding about 800° C., then too much stress is created in the undercoat film 2 due to the elevated temperature. As a result, the undercoat film 2 might peel off the ceramic base 1 or might drop quite a few chips. Accordingly, to increase the volume resistivity of the undercoat film 2 sufficiently without affecting other properties thereof substantially, the undercoat film 2 is more preferably annealed at a temperature of about 300° C. to about 600° C. By adopting this annealing method, the volume resistivity of the undercoat film 2 can be increased up to about $1 \times 10^{15}$ Ω·cm.

According to a second method, the volume resistivity of the undercoat film 2 of SiC is increased by heating the ceramic base 1 to an appropriate temperature or maintaining the base 1 at the temperature during the deposition process of the undercoat film 2 of SiC on the ceramic base 1. Even so, the volume resistivity of the undercoat film 2 deposited at the appropriate high temperature should be higher than that of the undercoat film 2 deposited at room temperature.

In that case, the undercoat film 2 may be deposited on the ceramic base 1 that has been heated to a predetermined temperature in advance. Alternatively, the undercoat film 2 may also be deposited on the ceramic base 1 that is being heated by an infrared lamp, for example. In any case, if the base is heated to, or maintained at, an elevated temperature during the deposition process of the undercoat film 2, the temperature of the base is preferably from about 200° C. to about 800° C. The reason is as follows. Specifically, if the temperature of the base is less than about 200° C., then the heating technique is not effective enough to increase the volume resistivity of the undercoat film 2 sufficiently. However, if the temperature of the base exceeds about 800° C., then too much stress is created in the undercoat film 2 due to the elevated temperature. As a result, the undercoat film 2 might peel off the ceramic base 1 or might drop quite a few chips. By heating the base to, or maintaining it at, such a high temperature during the deposition process of the undercoat film 2, the volume resistivity of the resultant undercoat film 2 can be increased to about $1 \times 10^{12}$ Ω·cm.

As described above, according to preferred embodiments of the present invention, the volume resistivity of the undercoat film 2 is controllable either by the temperature of the base being heated during the deposition process or by the temperature of the annealing process to be carried out on the film deposited. Thus, an undercoat film 2 having any volume resistivity can be formed on the ceramic base 1 depending on the intended application.

A preferred SiC film deposition temperature to achieve a desired volume resistivity can be determined quickly by collecting data about the deposition temperatures of the amorphous SiC thin films and the volume resistivity values of the resultant SiC thin films via experiments, for example. Accordingly, if the undercoat film 2 is deposited on the ceramic base 1 that has been, or is, heated to the preferred deposition temperature, then the undercoat film 2 deposited on the ceramic base 1 can have the desired volume resistivity.

Data about the annealing temperatures of the undercoat film 2 and the variations in volume resistivity of the undercoat film 2 before and after the annealing process may also be collected in a similar manner. By reference to such data, the volume resistivity of the undercoat film 2 can be adjusted to any desired value through the annealing process.

According to a third method, the volume resistivity of the amorphous SiC film may also be adjusted by changing the content(s) of H and/or Ar in the amorphous SiC film. In this case, the amorphous SiC film is preferably formed by an RF or DC sputtering process. Alternatively, the amorphous SiC film may also be formed by using an evaporation system with an ion assisting or biasing mechanism. Metal Si or SiC is used as the target of the sputtering process or the evaporation source of the evaporation process. The atmosphere to be created to deposit the amorphous SiC film preferably includes argon gas at a partial pressure ratio of about 0.1 to about 0.6, hydrocarbon gas at a partial pressure ratio of about 0.1 to about 0.9, hydrogen gas at a partial pressure ratio of about 0 to about 0.5, and oxygen gas at a partial pressure ratio of about 0 to about 0.05.

Optionally, before the amorphous SiC film is deposited, the surface of the base may be subjected to plasma processing. For example, the surface of the base, on which the amorphous SiC film has not been deposited yet, may be exposed to a plasma by starting electrical discharge with argon and hydrogen gases supplied at partial pressure ratios of about 0.5 to about 1 and at about 0 to about 0.5, respectively.

When deposited within such an atmosphere, the SiC film for use as the undercoat film 2 would include about 0 mol % to about 15 mol % of H and/or about 0 mol % to about 15 mol % of Ar when the sum of Si, C and O is supposed to be 100. By adjusting the mole percentage of H, the volume resistivity and hardness of the film can be controlled. However, if the mole percentage of H is too high, then the resultant film will turn into something like a resin and will not exhibit sufficient hardness. If the mole percentage of Ar is changed, then the volume resistivity and the stress of the film are adjustable. The present inventors confirmed that the volume resistivity of the SiC film can be adjusted more effectively by changing the mole percentage of H. As long as the volume resistivity, hardness and stress of the resultant film are all within their desired ranges without H or Ar, at least one of the mole percentages of H and Ar may be equal to zero. If the partial pressure ratios of the respective gases in the atmosphere to be created to deposit the amorphous SiC film are adjusted so as to be within the above-specified ranges, then the mole percentages of H and Ar can be changed within the range specified above.

According to this method, the volume resistivity of the amorphous SiC film can be adjusted without heating the base during the deposition process of the amorphous SiC film or annealing the amorphous SiC film deposited. Optionally, these two methods may be used in combination.

In each of these three methods, the lowest volume resistivity of the amorphous SiC film has only to be higher than the highest volume resistivity of the ceramic base 1 and is normally about $1 \times 10^{-1}$ $\Omega \cdot cm$. In that case, an amorphous SiC film having a volume resistivity of about $1 \times 10^5$ $\Omega \cdot cm$ or more can be obtained easily. This is advantageous from the viewpoint of mass production because a film with such a volume resistivity is easy to deposit.

EXAMPLES

Hereinafter, specific examples of preferred embodiments of the present invention will be described.

As shown in the following Tables 2 and 3, twenty-two samples Nos. 1 through 21 of thin-film magnetic head substrates were prepared and various properties thereof were analyzed.

Each of Samples Nos. 1 through 17 was obtained by depositing, by a sputtering process using a polycrystalline SiC target, an amorphous SiC film on bases having respective compositions shown in Table 1. Among these seventeen samples, as for Samples Nos. 1 through 8 and 17, the amorphous SiC film was deposited at room temperature and was not heated at all either during or after the deposition process. In Samples Nos. 9 through 12, the amorphous SiC film was deposited at room temperature and then annealed at respective temperatures shown in Table 2. In Samples Nos. 13 through 16 on the other hand, the base was heated to respective temperatures shown in Table 2 during the deposition process of the amorphous SiC film.

As for Samples Nos. 18 and 19 representing comparative examples, a polycrystalline SiC film was deposited by a CVD process.

As for Samples Nos. 20 through 22, the amorphous SiC film was deposited by a sputtering process using an Si target within an atmosphere including Ar, $CH_4$, $H_2$ and $O_2$ gases at the following partial pressure ratios. The amorphous SiC film was not heated either during or after the deposition process.

TABLE 1

| Sample No. | Ar | $CH_4$ | $H_2$ | $O_2$ |
|---|---|---|---|---|
| 20 | 0.6 | 0.2 | 0.15 | 0.05 |
| 21 | 0.25 | 0.6 | 0.1 | 0.05 |
| 22 | 0.45 | 0.3 | 0.2 | 0.05 |

The respective properties of these twenty-two samples obtained in this manner were analyzed by the following methods. The crystallinity of the film deposited was analyzed by an XRD analysis and the film was regarded as either amorphous or crystalline depending on whether or not a particular diffraction pattern was identified. The surface roughness values of the base and the film deposited were measured with a needle-contact-type roughness meter. The volume resistivity was measured with a surface resistivity meter. The chipping property was estimated by cutting the substrate with a peripheral cutting edge, observing the cut surface with a microscope to a magnification power of 100, and counting the number of chips of about 20 μm or more per unit length. The tribology property of the base was evaluated by a frictional resistance that was produced when the contact was started or stopped. And the thermal conductivity was measured by a laser flash method.

TABLE 2

| No | Process | Base material (vol %) | Volume resistivity ($\Omega \cdot cm$) | Annealing Temperature (° C.) | Temperature of base heated (° C.) |
|---|---|---|---|---|---|
| 1 | sputter | $Al_2O_3$—TiC(70:30) | $6 \times 10^7$ | No anneal | Not heated |
| 2 | sputter | $Al_2O_3$—$ZrO_2$(50:50) | $5 \times 10^7$ | No anneal | Not heated |
| 3 | sputter | $ZrO_2$—SiC(75:25) | $6 \times 10^7$ | No anneal | Not heated |
| 4 | sputter | $Al_2O_3$—SiC(75:25) | $6 \times 10^7$ | No anneal | Not heated |
| 5 | sputter | $Al_2O_3$—TiC(70:30) | $3 \times 10^7$ | No anneal | Not heated |
| 6 | sputter | $Al_2O_3$—TiC(70:30) | $2 \times 10^7$ | No anneal | Not heated |
| 7 | sputter | $Al_2O_3$—TiC(70:30) | $1 \times 10^7$ | No anneal | Not heated |
| 8 | sputter | $Al_2O_3$—TiC(70:30) | $1 \times 10^6$ | No anneal | Not heated |
| 9 | sputter | $Al_2O_3$—TiC(70:30) | $1 \times 10^7$ | 250 | Not heated |
| 10 | sputter | $Al_2O_3$—TiC(70:30) | $1 \times 10^8$ | 400 | Not heated |
| 11 | sputter | $Al_2O_3$—TiC(70:30) | $1 \times 10^9$ | 600 | Not heated |
| 12 | sputter | $Al_2O_3$—TiC(70:30) | $1 \times 10^{10}$ | 900 | Not heated |
| 13 | sputter | $Al_2O_3$—TiC(70:30) | $1 \times 10^8$ | No anneal | 200 |
| 14 | sputter | $Al_2O_3$—TiC(70:30) | $1 \times 10^9$ | No anneal | 300 |
| 15 | sputter | $Al_2O_3$—TiC(70:30) | $1 \times 10^{11}$ | No anneal | 500 |
| 16 | sputter | $Al_2O_3$—TiC(70:30) | $1 \times 10^{11}$ | No anneal | 900 |
| 17 | sputter | $Al_2O_3$—TiC(70:30) | $1 \times 10^7$ | No anneal | Not heated |
| 18 | CVD | $Al_2O_3$—TiC(70:30) | $1 \times 10^3$ | — | — |
| 19 | CVD | $Al_2O_3$—TiC(70:30) | $1 \times 10^8$ | — | — |
| 20 | sputter | $Al_2O_3$—TiC(70:30) | $2 \times 10^7$ | No anneal | Not heated |
| 21 | sputter | $Al_2O_3$—TiC(70:30) | $6 \times 10^{12}$ | No anneal | Not heated |
| 22 | sputter | $Al_2O_3$—TiC(70:30) | $9 \times 10^8$ | No anneal | Not heated |

In Table 1, "No anneal" in "annealing temperature" indicates that the amorphous SiC film deposited was not annealed, while "Not heated" in "temperature of base heated" indicates that the base was not heated during the deposition of the amorphous SiC film on the base.

TABLE 3

| No | Thickness (μm) | Film property | Base Surface roughness Ra (nm) | Film Surface roughness Ra (nm) | Chipping property | Base tri-bology (CSS) | Thermal conductivity |
|----|---|---|---|---|---|---|---|
| 1  | 1   | amorphous  | 1.5 | 0.7  | Excellent | excellent | Good |
| 2  | 2   | amorphous  | 2   | 0.85 | Excellent | excellent | Good |
| 3  | 3   | amorphous  | 2   | 0.9  | Excellent | excellent | Good |
| 4  | 3   | amorphous  | 2   | 0.85 | Excellent | excellent | Good |
| 5  | 8   | amorphous  | 1.5 | 0.65 | Excellent | excellent | Good |
| 6  | 0.8 | amorphous  | 1.5 | 0.8  | Excellent | excellent | Good |
| 7  | 1   | amorphous  | 1.5 | 0.7  | Excellent | excellent | Good |
| 8  | 0.5 | amorphous  | 1.5 | 1.0  | Excellent | excellent | Good |
| 9  | 1   | amorphous  | 1.5 | 0.7  | Excellent | excellent | good |
| 10 | 1   | amorphous  | 1.5 | 0.7  | Excellent | excellent | good |
| 11 | 1   | amorphous  | 1.5 | 0.7  | Excellent | excellent | good |
| 12 | 1   | amorphous  | 1.5 | 0.7  | Excellent | excellent | good |
| 13 | 1   | amorphous  | 1.5 | 0.7  | Excellent | excellent | good |
| 14 | 1   | amorphous  | 1.5 | 0.7  | Excellent | excellent | good |
| 15 | 1   | amorphous  | 1.5 | 0.85 | Good      | excellent | good |
| 16 | 1   | amorphous  | 1.5 | 1    | Bad       | excellent | good |
| 17 | 15  | amorphous  | 1.5 | 0.8  | Excellent | excellent | bad  |
| 18 | 1   | crystalline| 1.5 | 0.8  | Bad       | bad       | excellent |
| 19 | 3   | crystalline| 1.5 | 0.8  | Bad       | bad       | excellent |
| 20 | 1   | amorphous  | 1.5 | 0.96 | Excellent | good      | good |
| 21 | 3   | amorphous  | 1.5 | 0.95 | Excellent | good      | good |
| 22 | 0.5 | amorphous  | 1.5 | 2.55 | Excellent | good      | good |

As can be seen from the results of Samples Nos. 1 through 8 shown in Tables 2 and 3, each of these films that were deposited by the sputtering process was amorphous, had a surface roughness of less than about 1 nm, and exhibited a volume resistivity of at least about $1 \times 10^6$ Ω·cm. Also, all of these Samples Nos. 1 through 8 an exhibited excellent chipping property, an excellent base tribology property, and a sufficient thermal conductivity. Thus, it can be seen that Samples Nos. 1 through 7 of thin-film magnetic head substrates exhibited good electrical and thermal conductivities, good processibility and good mechanical property.

However, as can be seen from the results of Sample No. 17, if the SiC film deposited has a thickness of about 15 μm, the resultant thermal conductivity of the SiC film was bad.

On the other hand, the SiC films of Samples Nos. 18 and 19, which were deposited by a CVD process, were crystalline and exhibited excellent thermal conductivity. However, the chipping property and the base tribology property of these samples were bad. Thus, it can be seen that these samples were not effectively applicable for use as thin-film magnetic head substrates due to their bad processibility and bad mechanical property.

It can also be seen from the results of Samples Nos. 9 through 12 as shown in Table 2 that if the SiC film deposited was annealed, the volume resistivity of the SiC film could be controlled by the annealing temperature.

Furthermore, it can be seen from the results of Samples Nos. 13 through 16 as shown in Table 2 that the volume resistivity of the resultant SiC film could also be controlled even by changing the temperature of the base on which the SiC film was being deposited.

Furthermore, it can also be seen from the results of Samples Nos. 20 through 22 as shown in Table 2 that the volume resistivity of the resultant SiC film could be controlled by changing the partial pressure ratios of Ar and $CH_4$ gases.

Analyzing the compositions of Samples Nos. 1 through 17 and 20 through 22, the present inventors confirmed that the amorphous SiC film of each of these samples included about 20 at % to about 80 at % of Si and about 20 at % to about 80 at % of C as its main ingredients and about 5 at % to about 15 at % of O. On the other hand, the amorphous SiC film of each of Samples Nos. 20 through 22 included about 0 mol % to about 15 mol % of Ar when the sum of Si, C and O was supposed to be 100. The present inventors also confirmed that the amorphous SiC film of each of these samples had a Vickers hardness Hv of about 1,000 to about 1,600, a linear expansivity a of about 3.0 to about 5.0, and a Young's modulus of about 150 GPa to about 300 GPa.

Figure 3A:
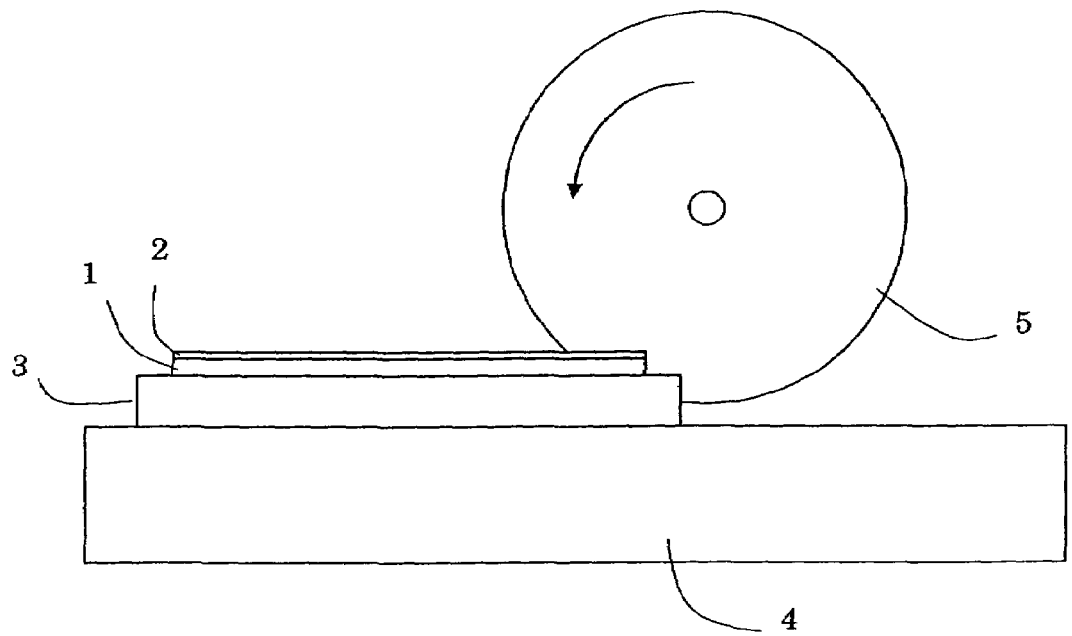
FIGS. 3A and 3B are respectively a side view and a plan view schematically illustrating the manufacturing processing step of cutting a thin-film magnetic head wafer with a dicing saw.
Figure 3B:
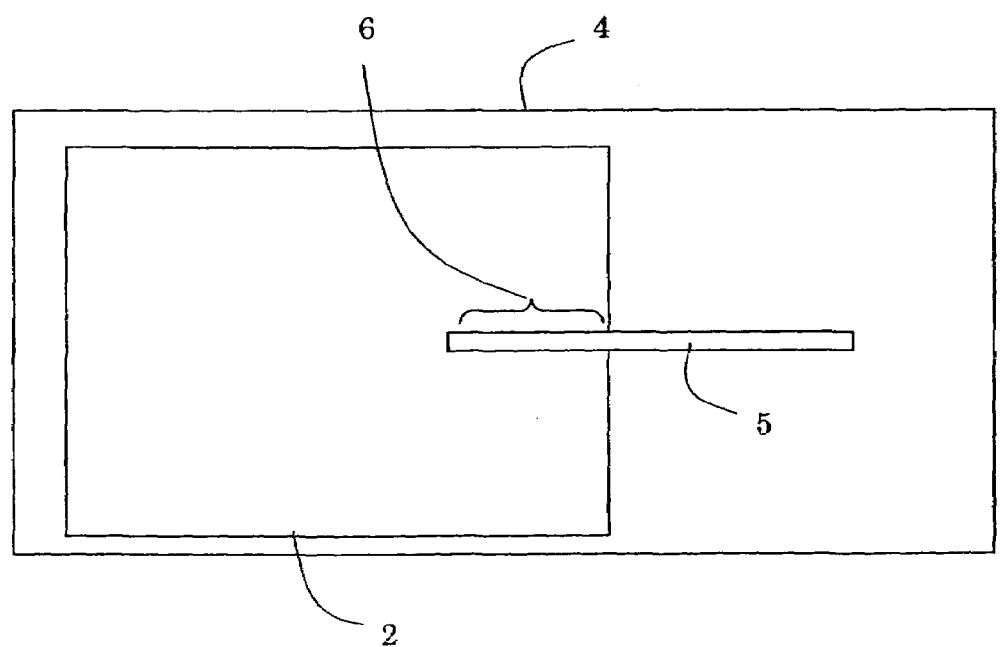

To analyze the chipping property of a thin-film magnetic head substrate according to a preferred embodiment of the present invention, the substrate was cut with a dicing saw and the cut surface was observed with an optical microscope. As shown in FIG. 3A, a thin-film magnetic head substrate, including an undercoat film 2 on a ceramic base 1, was fixed onto a bonding plate 3, which was mounted on a table 4. Then, the thin-film magnetic head substrate was cut with a dicing saw 5. As shown in FIG. 3B, the chipping phenomenon occurs in a portion of the undercoat film 2 of the thin-film magnetic head substrate that is in contact with the dicing saw 5.

Figure 4:
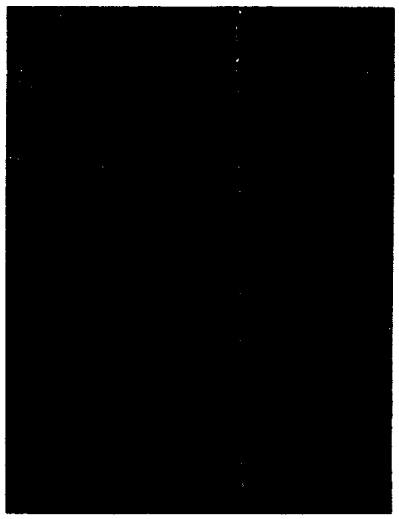
FIG. 4 is a micrograph showing a cut portion of a thin-film magnetic head substrate according to a preferred embodiment of the present invention from over the substrate.

FIG. 4 is a micrograph showing the portion of the thin-film magnetic head substrate, which was cut with the dicing saw, from over the substrate. In FIG. 4, the lower portion of the micrograph under the line that extends substantially horizontally shows the remaining portion of the thin-film magnetic head substrate. As can be seen from FIG. 4, the cut surface had almost no chipped portions, and the thin-film magnetic head substrate of this preferred embodiment exhibited a good chipping property.

Figure 5A:
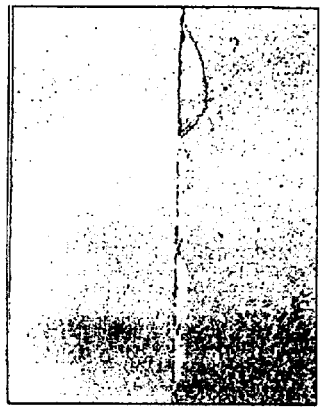
FIGS. 5A and 5B are micrographs showing respective cut portions of comparative thin-film magnetic head substrates, each including an undercoat film deposited by a CVD process, from over the substrates.
Figure 5B:
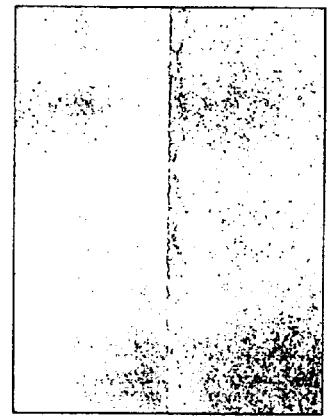

On the other hand, FIGS. 5A and 5B are micrographs showing the cut surfaces of comparative thin-film magnetic head substrates including a polycrystalline SiC film, deposited by a CVD process, as their undercoat film. In FIGS. 5A and 5B, the lower portion of the micrograph under the horizontal line also shows the remaining portion of the thin-film magnetic head substrate. As can be clearly seen from FIGS. 5A and 5B, the polycrystalline SiC film deposited by the CVD process was so brittle as to form a non-negligible number of chipped portions.

As is clear from the foregoing description, various preferred embodiments of the present invention provide an excellent thin-film magnetic head substrate, of which the thermal and electrical conductivities, processibility and mechanical property are all good enough to use it in a thin-film magnetic head slider for a high-capacity hard disk drive, by using an amorphous SiC film as the undercoat film. No material that satisfies all of these requirements fully has ever been described or suggested before. For example, a crystalline SiC film cannot satisfy all of these requirements at the same time as described above.

Also, if the amorphous SiC film is formed by a sputtering process, for example, the stress of the thin-film magnetic head substrate is controllable by adjusting the gas pressure, film deposition rate, bias voltage and other factors and characteristics. Thus, the best thin-film magnetic head substrate can be formed according to the specific application.

A thin-film magnetic head substrate according to any of various preferred embodiments of the present invention can be used effectively in a thin-film magnetic head slider for a high-capacity hard disk drive. Also, by using such a thin-film magnetic head slider, a highly reliable, high-capacity hard disk drive can be obtained. Exemplary methods of manufacturing a thin-film magnetic head slider and a hard disk drive by using a thin-film magnetic head substrate are disclosed in Japanese Laid-Open Publications Nos. 5-151736 and 5-166309, for example.

Hereinafter, a specific preferred embodiment of a thin-film magnetic head slider according to the present invention will be described with reference to the accompanying drawings.

Figure 6:
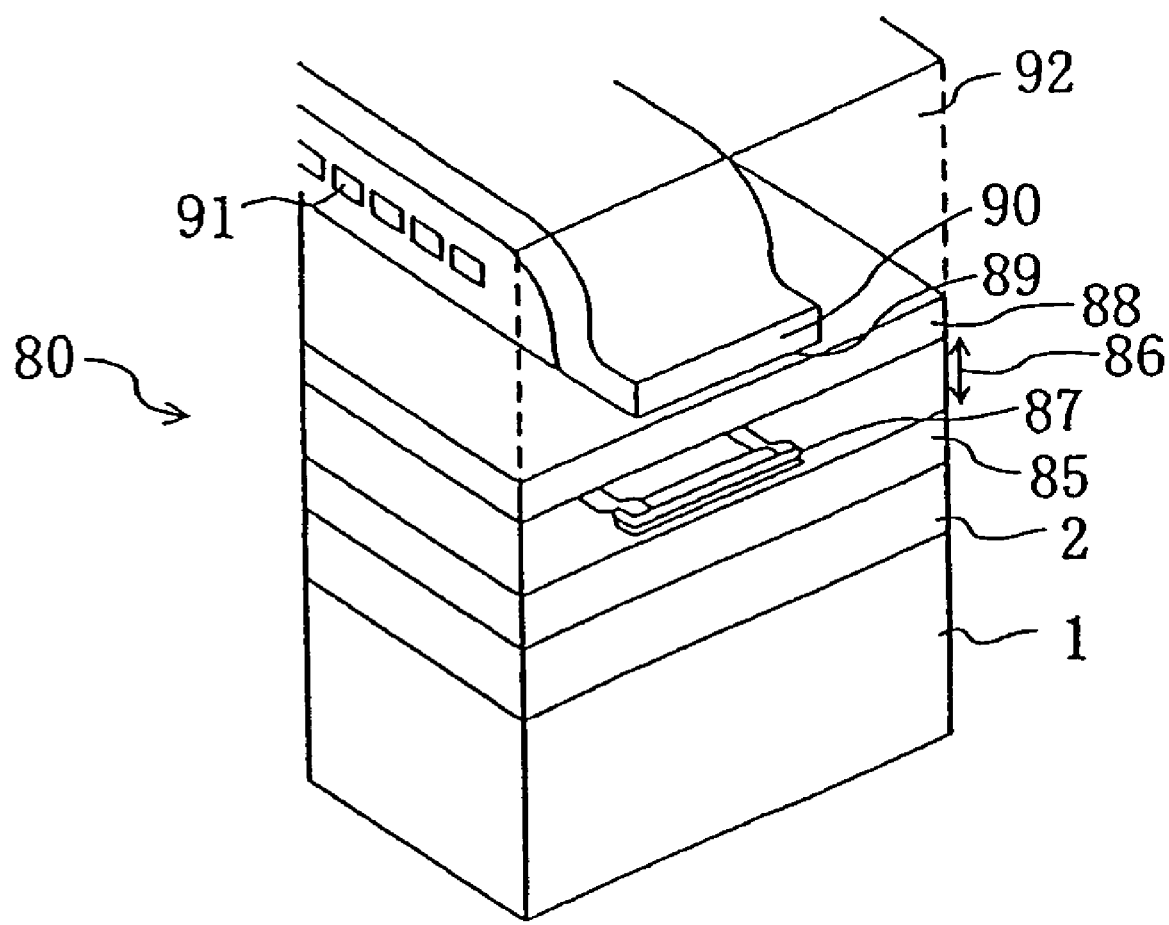
FIG. 6 is a perspective view illustrating main portions of a thin-film magnetic head slider according to a preferred embodiment of the present invention.

FIG. 6 is a perspective view illustrating main portions of a thin-film magnetic head slider 80. Although no gimbal for the thin-film magnetic head slider 80 is shown in FIG. 6, the main portions shown in FIG. 6 are actually attached to a gimbal similar to that shown in FIG. 9A.

As shown in FIG. 6, the thin-film magnetic head slider 80 preferably includes a ceramic base 1, an undercoat film 2 that has been deposited on the ceramic base 1, and a shield film 85 that has been deposited on the undercoat film 2. In this preferred embodiment, an amorphous SiC film, having the composition described above and having a thickness of about 2 µm to about 3 µm, is preferably formed as the undercoat film 2 by a DC sputtering process.

A gap 86 of about 0.4 µm is preferably provided over the shield film 85. A GMR read head 87 is preferably embedded in the gap 86 and may have a known structure including an electrode and a GMR film (not shown). The gap 86 may be an insulating film formed of alumina, for example, which has been deposited on the shield film 85 so as to cover the GMR read head 87. The GMR read head 87 may have a thickness of about 0.1 µm. It should be noted that the magnetic element (i.e., read head) to be provided on the shield film 85 is not limited to the GMR element but may also be any other type of magnetic element such as an MR or TMR element.

Another shield film 88 is preferably deposited on the insulating film that defines as the gap 86. These two shield films 85 and 88 are preferably made of a soft magnetic material such as a permalloy, and may also function as magnetic shield films. A top pole 90 (with a thickness of about 2 µm to about 3 µm) is preferably provided over the shield film 88 with a write gap 89 of about 0.4 µm to about 0.6 µm provided between them. A coil pattern 91, formed by patterning a Cu film with a thickness of about 5 µm, is preferably provided between the shield film 88 and the top pole 90. The coil pattern 91 is preferably coated with an organic insulating film. The shield film 88 (functioning as a bottom pole), coil pattern 91 and top pole 90 together define a write head portion. When a current is supplied through the coil pattern 91, a magnetic field is generated near the write gap 89, thereby writing (i.e., recording) data onto a magnetic storage medium (not shown). The write head portion is preferably covered with an overcoat film with a thickness of about 40 µm, for example. This multilayer structure may be formed by a normal thin film deposition process or photolithographic process. When the head portion shown in FIG. 6 is completed, the head portion is attached to a gimbal (not shown) to obtain a thin-film magnetic head slider.

In the thin-film magnetic head slider of this preferred embodiment, the undercoat film 2 has good thermal conductivity and adequate electrical conductivity. Thus, the read or write head will not expand thermally due to the heat generated from the head itself and will never contact with the magnetic storage medium. In addition, the unwanted electrostatic or dielectric breakdown phenomenon is prevented from occurring in this thin-film magnetic head slider. Thus, a thin-film magnetic head slider, having a processibility and mechanical property that are both good enough for use in a high-capacity hard disk drive, can be provided.

In the preferred embodiments described above, the undercoat film is preferably deposited directly on the ceramic base. However, the undercoat film does not have to be deposited on the ceramic base directly. Optionally, a thin film with good electrical and thermal conductivities may be provided between the undercoat film and the ceramic base.

According to various preferred embodiments of the present invention described above, the read or write head of a thin-film magnetic head slider will not expand thermally due to the heat generated from the head itself, and will never contact with a magnetic storage medium. In addition, the unwanted electrostatic or dielectric breakdown phenomenon will not happen in the thin-film magnetic head slider, either. Thus, a thin-film magnetic head substrate, having processibility and mechanical property which are both good enough for use in a high-capacity hard disk drive, is provided.

Also, by using such a thin-film magnetic head substrate, a highly reliable thin-film magnetic head slider and a hard disk drive can be obtained.

It should be understood that the foregoing description of various preferred embodiments is only illustrative of the present invention. Various alternatives and modifications can be devised by those skilled in the art without departing from the present invention. Accordingly, the present invention is intended to embrace all such alternatives, modifications and variances which fall within the scope of the appended claims.

The invention claimed is:

1. A thin-film magnetic head substrate, comprising:

a ceramic base; and an undercoat film of amorphous SiC, which is supported on the ceramic base;

wherein the amorphous SiC includes about 20 at % to about 80 at % of Si and about 20 at % to about 80 at % of C as its main ingredients, and about 5 at % to about 15 at % of O; and wherein the undercoat film has a volume resistivity of about $1\times10^{-1}$ Ω·cm to about $1\times10^{8}$ Ω·cm.

2. The substrate of claim 1, wherein the undercoat film has a thickness of about 0.1 μm to about 10 μm.

3. The substrate of claim 1, wherein the undercoat film has an average surface roughness of at most about 1 nm.

4. The substrate of claim 1, wherein the amorphous SiC further includes at least one of H and Ar.

5. The substrate of claim 1, wherein the ceramic base has a thermal conductivity of at least about 5 W/mK.

6. The substrate of claim 1, wherein the ceramic base has a volume resistivity of about $1\times10^{-5}$ Ω·cm to about $1\times10^{8}$ Ω·cm.

7. The substrate of claim 1, wherein the ceramic base has an average surface roughness of at most about 2.5 nm.

8. The substrate of claim 1, wherein the ceramic base is made of an alumina-based ceramic material including about 24 mol % to about 75 mol % of α-$Al_2O_3$ and at most about 2 mol % of additive.

9. The substrate of claim 8, wherein the alumina-based ceramic material further includes about 24 mol % to about 75 mol % of a metal carbide or a metal carbonate nitride.

10. A thin-film magnetic head slider comprising:
   the thin-film magnetic head substrate according to claim 1; and
   a read head and a write head, which are supported on the substrate.

11. A hard disk drive comprising the thin-film magnetic head slider of claim 10.

* * * * *